United States Patent [19]

Barnard

[11] Patent Number: 5,197,550
[45] Date of Patent: Mar. 30, 1993

[54] MECHANIZED BEET HARVESTER
[75] Inventor: W. Tennan Barnard, Wilder, Id.
[73] Assignee: PARMA Company, Parma, Id.
[21] Appl. No.: 794,963
[22] Filed: Nov. 20, 1991
[51] Int. Cl.⁵ ............................................. A01D 25/04
[52] U.S. Cl. ..................................... 171/58; 56/16.6; 171/138
[58] Field of Search ................. 171/1, 23, 45, 58, 110, 171/118, 130, 144, 138; 56/327.1, 16.6

[56] References Cited

U.S. PATENT DOCUMENTS

| | | | |
|---|---|---|---|
| 3,653,445 | 4/1972 | Barnes | 171/58 |
| 3,792,733 | 2/1974 | Crandall et al. | 171/58 |
| 4,798,248 | 1/1989 | Schwitters | 171/58 X |

FOREIGN PATENT DOCUMENTS 1279557  12/1986  U.S.S.R. .................................. 171/58

Primary Examiner—David J. Bagnell
Attorney, Agent, or Firm—Frank J. Dykas; Craig M. Korfanta; Ken J. Pedersen

[57] ABSTRACT

The invention is a mechanized beet harvester with a front-end beet digging and lifting assembly. A special grabroll assembly whch directs the beets inwardly from both ends of the harvester towards the center and backwardly towards a low level pick-up reservoir in an elevator assembly which lifts the beets to a storage/discharge system.

1 Claim, 4 Drawing Sheets

MECHANIZED BEET HARVESTER

BACKGROUND OF THE INVENTION

1. Technical Field.

This invention relates to farm machinery, especially mechanized beet harvesters. In particular, it relates to a tow-type beet harvester which digs the beets from the ground and lifts them for loading into a bin for transport from the field.

2. Background Art.

There have been prior art beet harvesters with front-end beet digging and lifting assemblies. However these prior art harvesters have generally utilized conveyor assemblies which direct the dug beets perpendicularly relative to the direction of the beet row, and the direction of the travel of the tow tractor, from one side of the harvester to the other to an elevator assembly. These prior art harvesters have encountered difficulties in that field debris, including dirt clods, beet tops and weeds, travel with the beets across the conveyor assembly and build up at the far end of it, eventually clogging it.

DISCLOSURE OF INVENTION

What we have invented is:

A mechanized beet harvester comprising:
(a) a front-end beet digging and lifting assembly for working a plurality of beet rows;
(b) a grabroll assembly for receiving beets from the said digging and lifting assembly, which grabroll assembly directs the beets inwardly from both ends of the grabroll assembly towards the center of the harvester and backwardly towards the back of the harvester;
(c) an elevator assembly for receiving beets from the said grabroll assembly, which elevator assembly has a pick-up level lower than the top of the said grabroll assembly, and which elevator assembly lifts the beets to a storage and discharge assembly.

BEST MODE FOR CARRYING OUT INVENTION

Referring to FIGS. 1–4, there is depicted a preferred embodiment of our invention.

Figure 1:
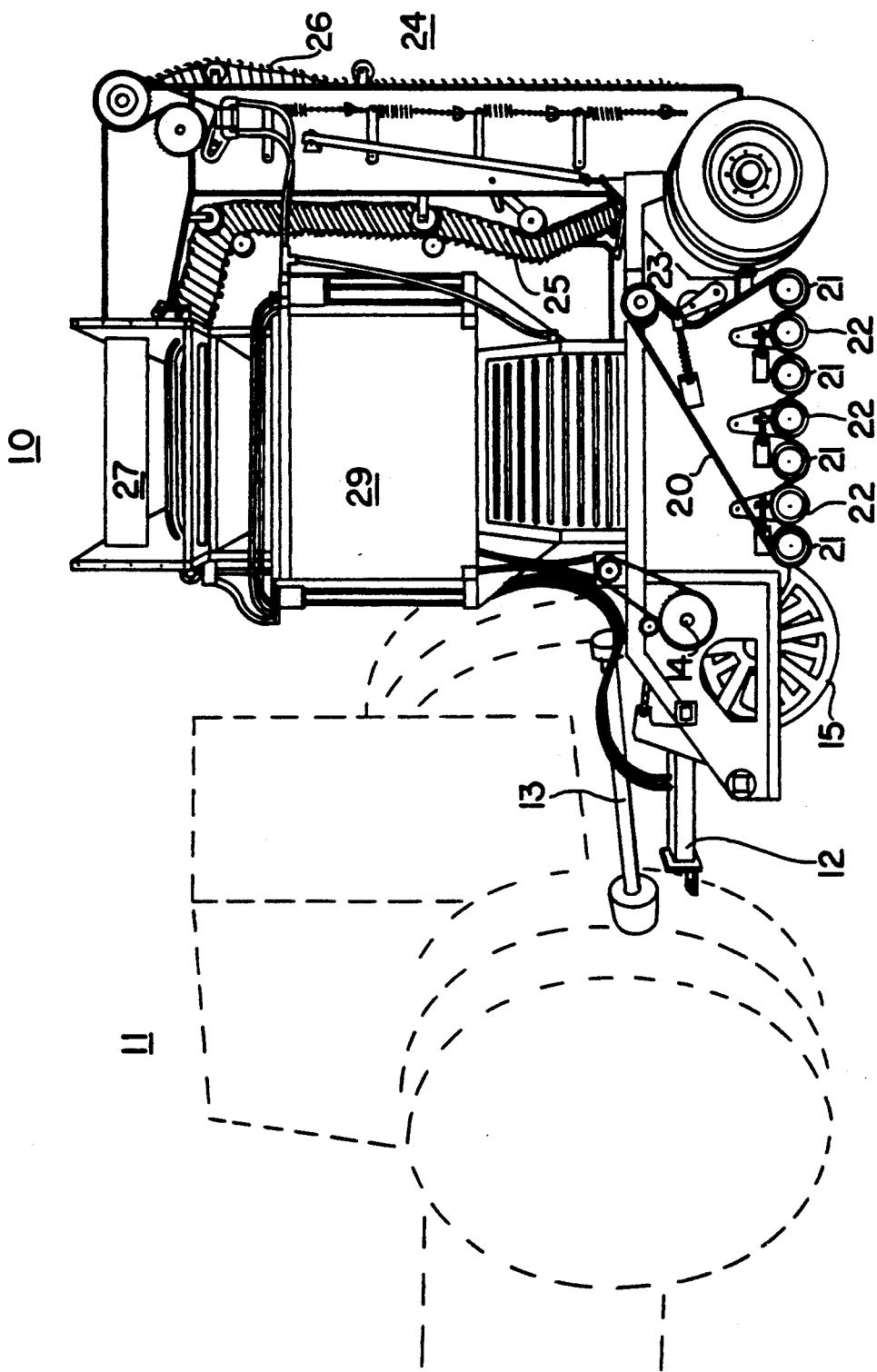
FIG. 1 is a side view of our beet harvester being towed behind a tractor (in ghost lines)

FIG. 1 depicts generally our beet harvester 10 being towed behind a tractor 11 by tow bar 12. A power takeoff (PTO) connector 13 provides power from the tractor to the various powered mechanisms of the beet harvester.

The harvester has a front-end beet digging and lifting assembly depicted generally at 14. This assembly is well-known in the beet harvesting industry, and comprises one set of Opel-style lifter wheels 15 for each row of beets to be worked, and one set of shaft-driven paddles 32 for each set of lifter wheels to knock the lifted beets out of the wheels and directly, without an additional conveying means, onto the grabroll assembly.

Figure 2:
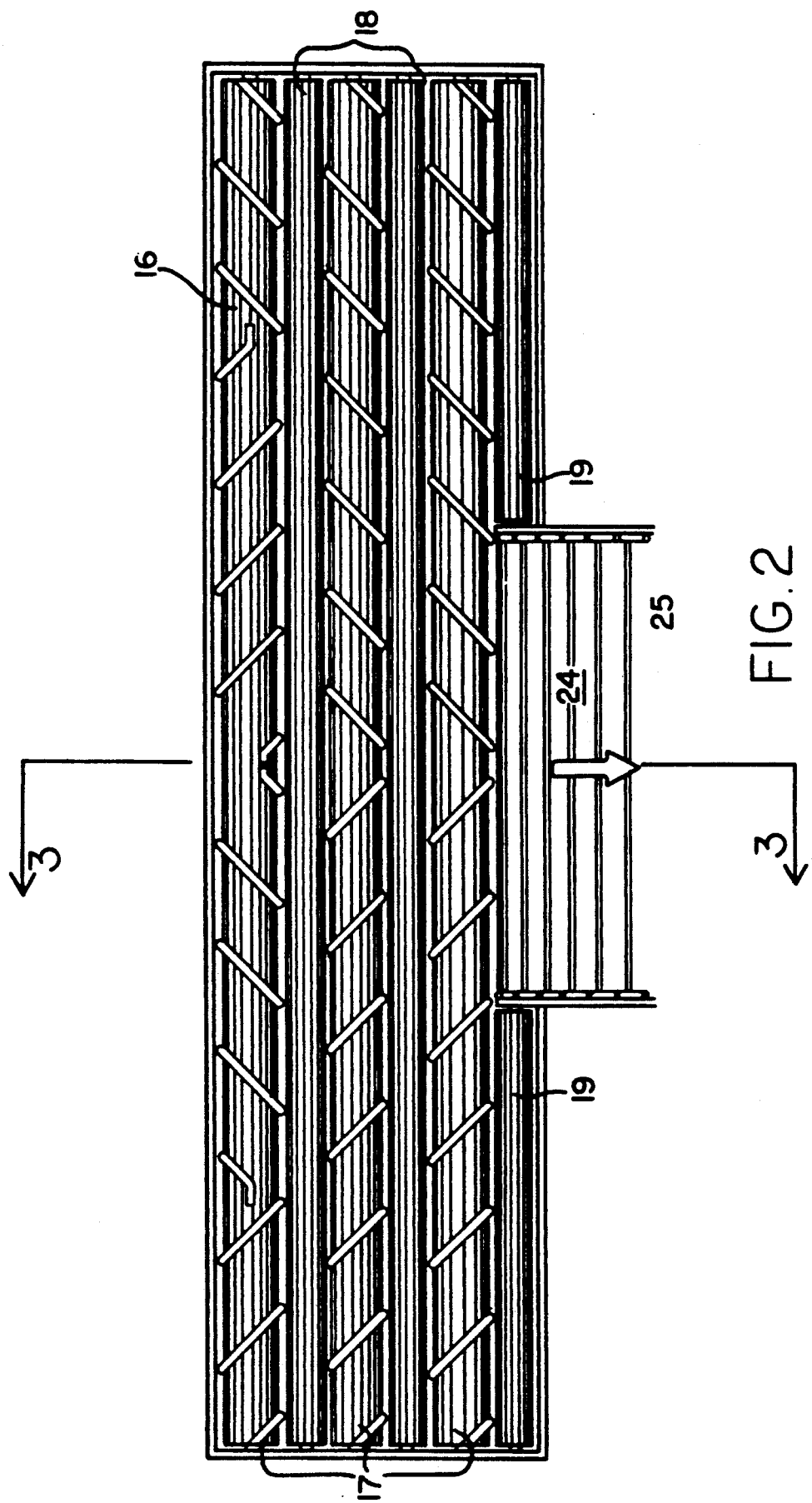
FIG. 2 is a partial top view of the grabroll assembly and part of the elevator assembly of our beet harvester.

A top view of the grabroll conveyor assembly 16 is depicted in FIG. 2. It comprises a set of three spiral grabrolls 17, and alternating therebetween two long smooth grabrolls 18 and two short smooth grabrolls 19. The grabrolls have their axes aligned in respective level planes. The grabrolls are driven at their ends by belt 20 and a series of alternating sheaves 21 and idler wheels 22 so that the spiral grabrolls rotate in opposite direction to the smooth grabrolls. Power to belt 20 is provided by the PTO connector 13 to sheave 23.

Spiral grabrolls 17 comprise cylindrical metal tubes with metal bars, wrapped and welded on their surfaces in spiral fashion. The spiral is designed to direct beets on the grabroll inwardly away from the edges, toward the center of the harvester, and backwardly from the front where the digging and lifting assembly is located to the back where the elevator assembly is located.

In our preferred embodiment, the front grabroll is a special spiral grabroll wrapped and welded with 4 metal bars. The grabroll rotates toward the front of the harvester, and is a mirror image about its transverse centerline. At each end is a bar wrapped about one-half way towards the centerline with a thread which traverses the tube towards the front of the harvester. Then, beginning on each side about one-half way towards the centerline is a bar wrapped up to the centerline with a thread which traverses the tube towards the back of the harvester.

The back two grabrolls are identical, wrapped and welded with 2 metal bars. They are also mirror images about their transverse centerlines. At each end is a bar wrapped up to the centerline with a thread which transverses the tube towards the front of the harvester.

Between each spiral grabroll is a smooth grabroll which rotates toward the back of the harvester. There are adjustable spaces between each grabroll which allows room for dirt and debris to fall out of the harvester between the grabrolls. Surprisingly, the effect of our special grabroll assembly is to provide a conveyor system which directs the beets inwardly from both ends towards the center of the harvester, and backwardly towards the back of the harvester and the elevator assembly.

Figure 3:
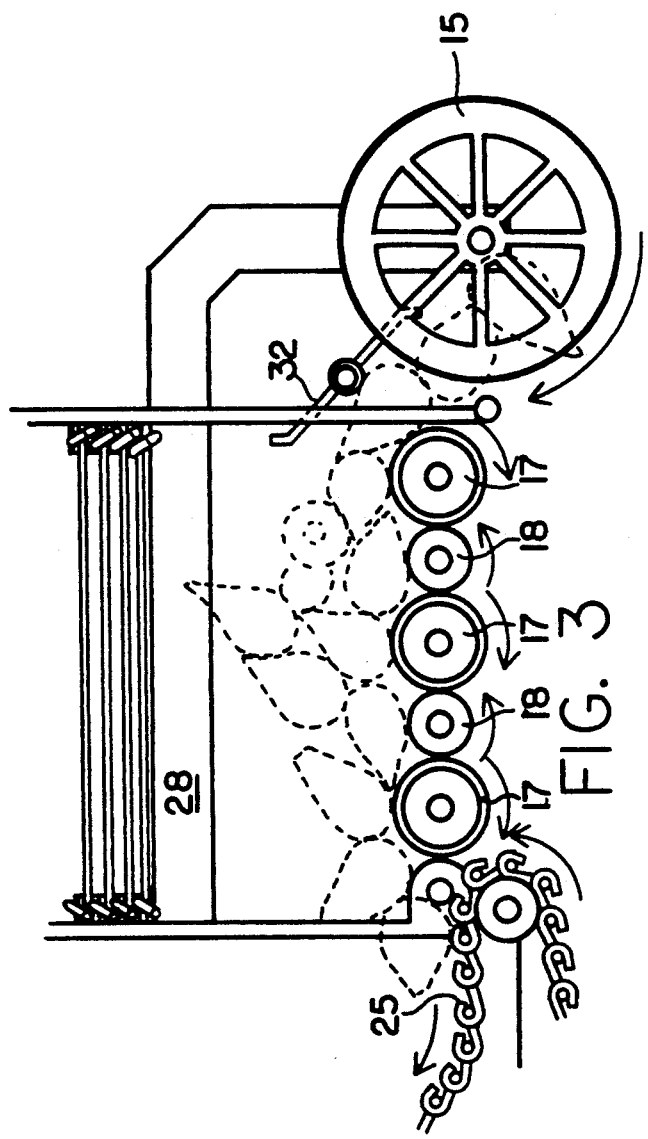
FIG. 3 is a partial cross-sectional side view along the line 3—3 in FIG. 2.

There, the beets fall off the grabroll conveyor assembly and directly, without an additional conveying means, onto an elevator assembly 24 shown partially in top view in FIG. 2. Elevator assembly 24 comprises two chains of hooked rods, inside chain 25 and outside chain 26, which squeeze beets between themselves to lift the beets to a storage and discharge assembly indicated generally at 27. It is important that the pick-up level at the bottom of the elevator be lower than the top of the back of the grabroll assembly as depicted in FIG. 3. This way, the beets tumble down off the grabrolls into the take-up reservoir 28 which is the pick-up area for the elevator, and they are much less likely to clog the elevator. A wide, high and deep reservoir is the key to a grabroll and elevator assembly which is free from clogging.

The beets are also cleaned of dirt clods and other debris in the elevator. The bouncing of the harvester machine from the rough field, and the shaking of the two chains from the travel in their sheaves and idlers knock dirt and clods and other debris off the beets which fall through the spaces between the rods which make up the chain.

At the top of the elevator, the beets may be directed to either a temporary storage system built into the harvester, or to a discharge system which unloads them into a truck bin or trailer, for example, for removal from the field.

The temporary storage system is a tank indicated generally at 29. The tank is used to receive beets during periods when a truck is not available with a bin or trailer. This way, the beet harvester need not stop, or even slow down, between truck changes, or while a single truck makes a short trip to unload its cargo of beets.

Figure 4:
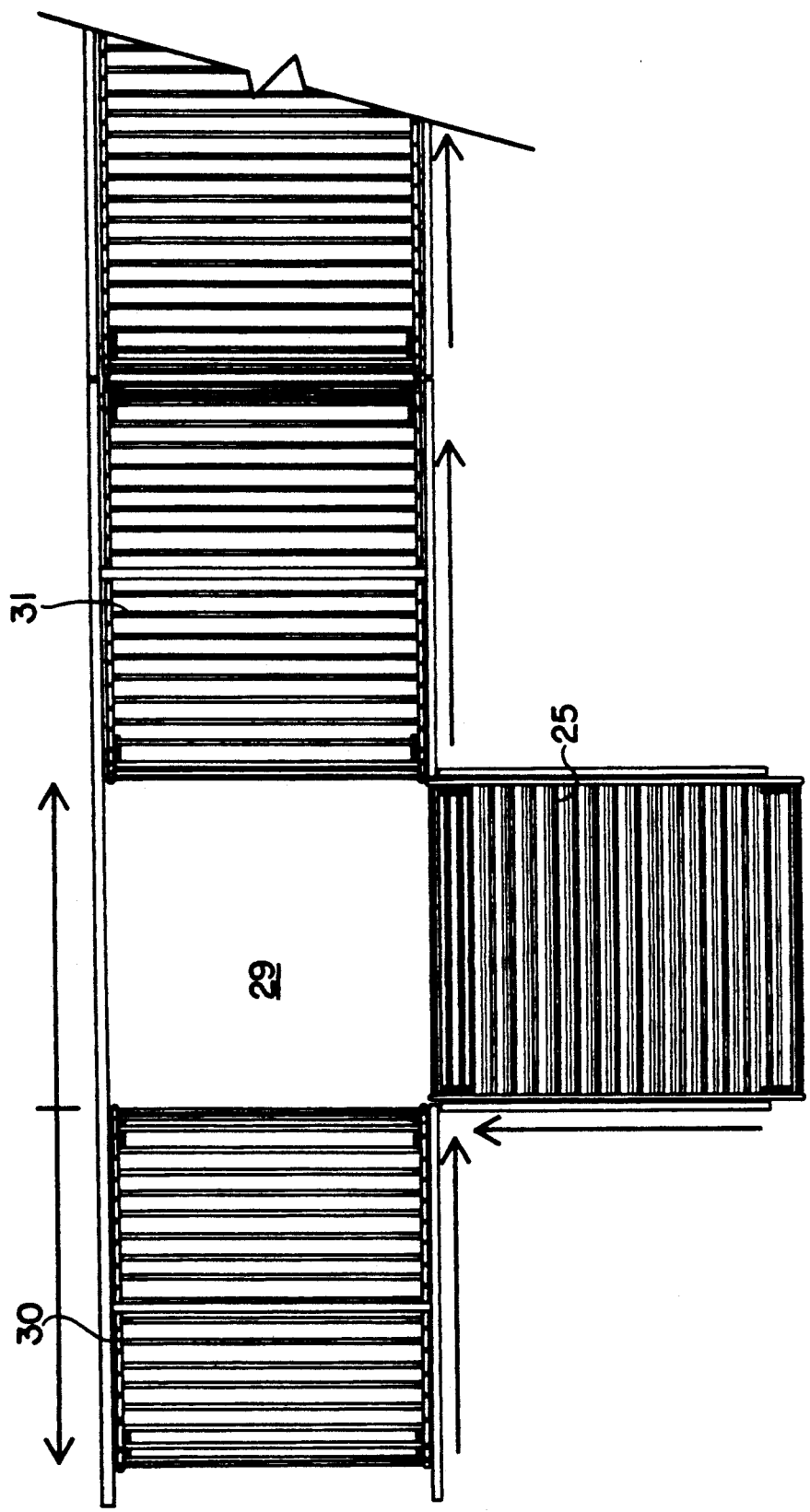
FIG. 4 is a partial top view of a detail of the storage and discharge assembly of our beet harvester.

A storage/discharge system detail is depicted in FIG. 4. Inside elevator 25 transports the beets in the direction of the arrow. With the storage/discharge system in the temporary storage mode (as shown), first conveyor section 30 is moved to the left side in the drawing by a pneumatically operated piston and the beets tumble off the end of the elevator 25 into tank 29 for temporary storage. Tank 29 has a tank discharge assembly (not shown) comprising a discharge conveyor which may be activated to move beets from the bottom of tank 29 into take-up reservoir 28 for discharge via elevator assembly 24 when the storage/discharge system is in the discharge mode.

In the discharge mode, first conveyor section 30 is moved toward the right in the drawing, covering the opening of tank 29. The beets tumble off the end of elevator 25 onto first conveyor section 30 which moves them in the direction of the arrow onto second conveyor section 31 for discharge into a waiting truck bin or trailer.

While there is shown and described the present preferred embodiment of the invention, it is to be distinctly understood that this invention is not limited thereto but may be variously embodied to practice within the scope of the following claims.

I claim:

1. A mechanized beet harvester comprising
  a. a front-end beet digging and lifting assembly for working a plurality of beet rows, said front-end assembly consisting of one set of lifter wheels and one set of paddles for each row of beets to be worked;
  b. a grabroll assembly for receiving beets directly from the said digging and lifting assembly, without an additional conveying means between said digging and lifting assembly and said grabroll assembly, which grabroll assembly directs the beets inwardly from both ends of the grabroll assembly towards the center of the harvester and backwardly towards the back of the harvester, said grabroll assembly comprising alternating spiral and smooth grabrolls with their axes aligned in respective level planes, and;
  c. an elevator assembly for receiving beets directly from the said grabroll assembly, which elevator assembly is without an additional conveying means between it and said grabroll assembly, which elevator assembly has a pick-up level lower than the top of the said grabroll assembly, and which elevator assembly lifts the beets to a storage and discharge assembly.

* * * * *